(12) United States Patent
Hung (10) Patent No.: US 8,428,826 B1
(45) Date of Patent: Apr. 23, 2013

(54) METHOD OF ACTUATING EXTERNAL ACTIVE SAFETY SYSTEM FOR VEHICLE

(76) Inventor: Wei-Hung Hung, New Taipei (TW)

( * ) Notice: Subject to any disclaimer, the term of this patent is extended or adjusted under 35 U.S.C. 154(b) by 0 days.

(21) Appl. No.: 13/536,124

(22) Filed: Jun. 28, 2012

(30) Foreign Application Priority Data

Oct. 17, 2011 (TW) .............................. 100137544 A

(51) Int. Cl.
*B60R 22/00* (2006.01)
(52) U.S. Cl.
USPC ............................................................ 701/45
(58) Field of Classification Search ........................ None
See application file for complete search history.

*Primary Examiner* — Thomas Tarcza
*Assistant Examiner* — Adam Alharbi
(74) *Attorney, Agent, or Firm* — Bacon & Thomas, PLLC (57) ABSTRACT

A method of actuating an external active safety system for a vehicle is used for cushioning the impact on the vehicle generated in an accident to effectively reduce injury and death as well as vehicle damage rates after an accident. The present invention mainly installs multiple sets of shock absorption devices (for example, airbags) outside the vehicle, for example, on front and rear bumpers, respectively, and the sets of shock absorption devices is able to function in advance in a segmental manner, so that the shock absorption devices installed outside the vehicle function before and during a collision in a segmental manner, so as to cushion an impact on the vehicle body when impacting or being impacted, and the shock absorption devices have an automatic release function, which, when activated, automatically releases an inflated condition of airbags in a very short time.

4 Claims, 7 Drawing Sheets

METHOD OF ACTUATING EXTERNAL ACTIVE SAFETY SYSTEM FOR VEHICLE

BACKGROUND OF THE INVENTION

1. Field of the Invention

A method of actuating an external active safety system for a vehicle is used for reducing injury and vehicle damage rates in automobile accidents. In particular, the present invention is a method of actuating an external active safety system for a vehicle which can calculate possible collisions in advance and actuate shock absorption devices in a sectional manner, so as to reduce injury and death as well as vehicle damage rates.

2. Related Art

At present, most of the conventional technologies or devices relevant to automobile safety, for example, the relevant technologies such as collision avoidance, airbags, and shock absorption, actuate the shock absorption device only after a collision signal is sensed or detected, so as to achieve the objective of reducing injuries and deaths, namely, the major effects all occur after the collision. For example, in the technical solution disclosed in Taiwanese Patent No. M240023 (INFLATED AUTOMOBILE BUMPER STRUCTURE), an airbag 20 is mainly installed inside a bumper body 10, and when a collision occurs on the vehicle body 30, the airbag 20 installed inside the bumper body 10 can generate a proper shock absorbing capacity to cushion the impact on the vehicle body 30 to protect the integrity of the vehicle body 30. However, the airbag 20 disclosed in this patent is inflated with air after the bumper body 10 is impacted, which fails to provide a preventive function effectively before the vehicle body 30 is impacted. Also, only one set of airbags 20 is provided, which is insufficient for the effect of reducing injury and death as well as vehicle damage rates after the vehicle body is impacted. Please further refer to Taiwanese Patent No. M281849 (SHOCK ABSORPTION STRUCTURE OF VEHICLE BUMPER), and in the technical solution thereof, a shock absorption structure of a vehicle bumper is mainly provided, in which a sensor 11 is installed in front of the bumper 10 of the vehicle, and inside a reinforcing component 12 is installed along the bumper 10. The bumper 10 is combined with the vehicle frame by using several oil hydraulic cylinders 20, and the oil hydraulic cylinders 20 can be controlled and actuated by an oil hydraulic motor. The oil hydraulic motor 30 can control the oil hydraulic cylinders 20 to drive the bumper 10 to move forward and backward. The sensor 11 installed on the bumper 10 is linked with the oil hydraulic motor 30 to detect and return a signal to actuate the oil hydraulic motor 30. The oil hydraulic motor 30 is further configured with a controller 40, an adjustment switch 50, and a pressure indicator 60. The controller 40 can manually control the actions of the oil hydraulic motor 30, the adjustment switch can adjust the pressure of the oil hydraulic motor 30 on the oil hydraulic cylinder 20, and the pressure indicator 60 can indicate the pressure generated in the oil hydraulic motor 30. Through the above structural combination, the vehicle body can be prevented from excessive compression and deformation, and indirectly, it can be further prevented that the driver and passengers are trapped in the deformed vehicle body. However, although the above technical solution can effectively reduce the force when the vehicle body is impacted, the technical solution has excessively high construction cost and is not economically efficient. Therefore, though the technical solutions above have the functions of reducing the impact generated from the collision of the vehicle body, many improvements still need to be made.

SUMMARY OF THE INVENTION

In view of the above problems, relying on years of experience in the research and development of related products, the inventor intends to develop a more suitable solution by researching and analyzing the integral structure of a vehicle and the state of the vehicle after a collision. Therefore, the main objective of the present invention is to provide a method of actuating an external active safety system for a vehicle, which can function in a sectional manner in advance with multiple sets of shock absorption devices, so as to reduce injury and death as well as vehicle damage rates after an accident.

To achieve the above objective, in the present invention, multiple sets of shock absorption devices are mainly installed outside the bumpers in front and rear of a vehicle body in advance, and state detection devices are configured in front and rear of the bumpers, respectively. When the vehicle is running, the state detection device can further monitor the distance between the vehicle and surrounding physical objects outside the vehicle and detect whether the vehicle speed conforms to safety data. If it is detected that the current state does not conform to the safety data, an alarm can be generated in advance, and one of the shock absorption devices is actuated in advance, and it is further determined whether to actuate other shock absorption devices in sequence according to a subsequent condition. As the multiple sets of shock absorption devices function in a sectional manner, injury and death as well as vehicle damage rates after an accident can be effectively reduced.

The description on the content and implementation of the present invention is to illustrate and explain the spirit and principles of the present invention, and to provide further explanation about the claims of the present invention.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
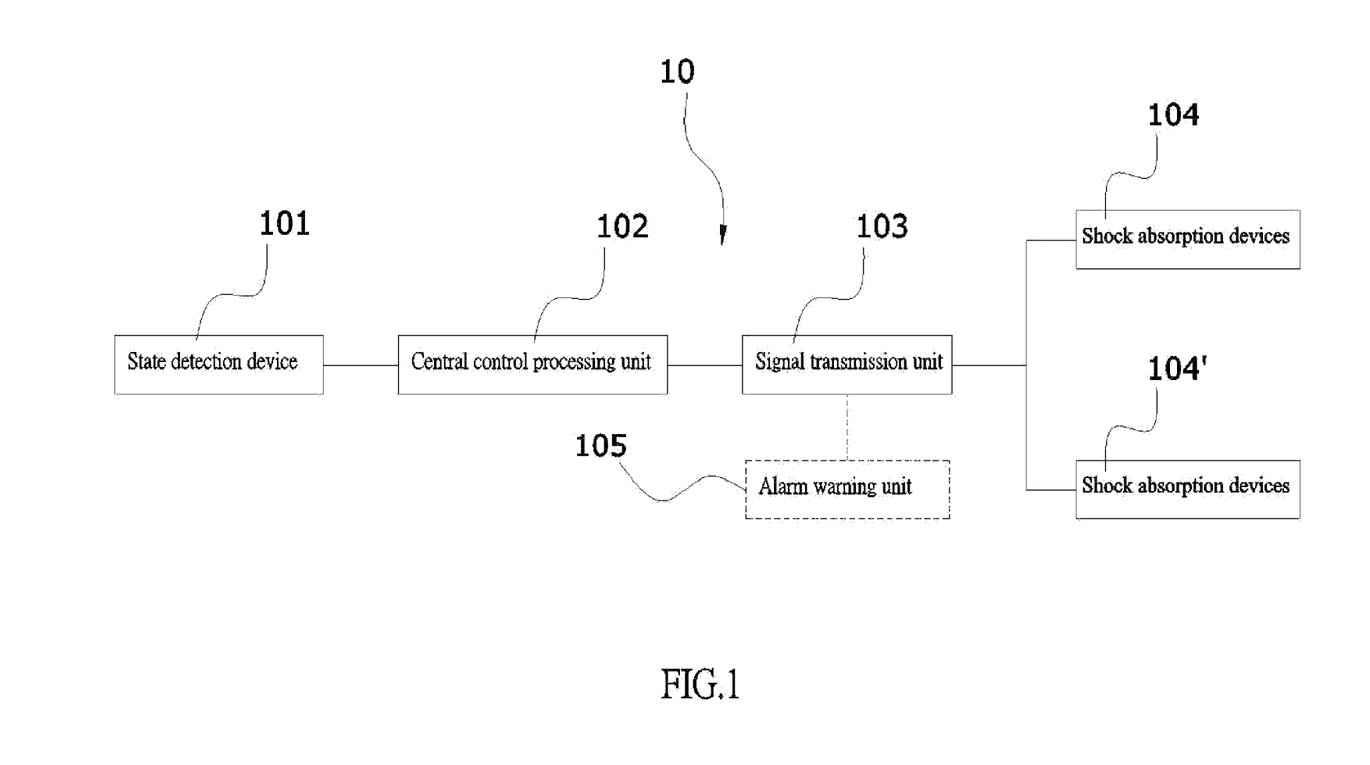
FIG. 1 is a schematic view of the components of the present invention.

Referring to FIG. 1, FIG. 1 is a schematic view of the components of the present invention. As shown in FIG. 1, an external active safety system for a vehicle 10 mainly consists of a state detection device 101, a central control processing unit 102, a signal transmission unit 103 and several shock absorption devices (104, 104'). The state detection device 101 is a sensor, which can detect the relative distance between a vehicle and a physical object in front, and may also monitor the relative speed between the vehicle and a vehicle in front at the same time. The state detection device 101 is informational connected with the central control processing unit 102. The state detection device 101 can transmit the relevant information such as the speed or distance detected in a normal state to the central control processing unit 102 for data analysis and monitoring. The central control processing unit 102 transmits the analyzed relevant information to the signal transmission unit 103 to release an actuation signal to drive multiple sets of shock absorption devices (104, 104') to operate. The shock absorption devices (104, 104') can be airbags. Further, the signal transmission unit 103 can be informational connected with an alarm warning unit 105, namely, before actuating the shock absorption devices (104, 104'), the signal transmission unit 103 can actuate the alarm warning unit 105 in advance or synchronously to generate an alarm tone to inform the driver an imminent situation.

Figure 2:
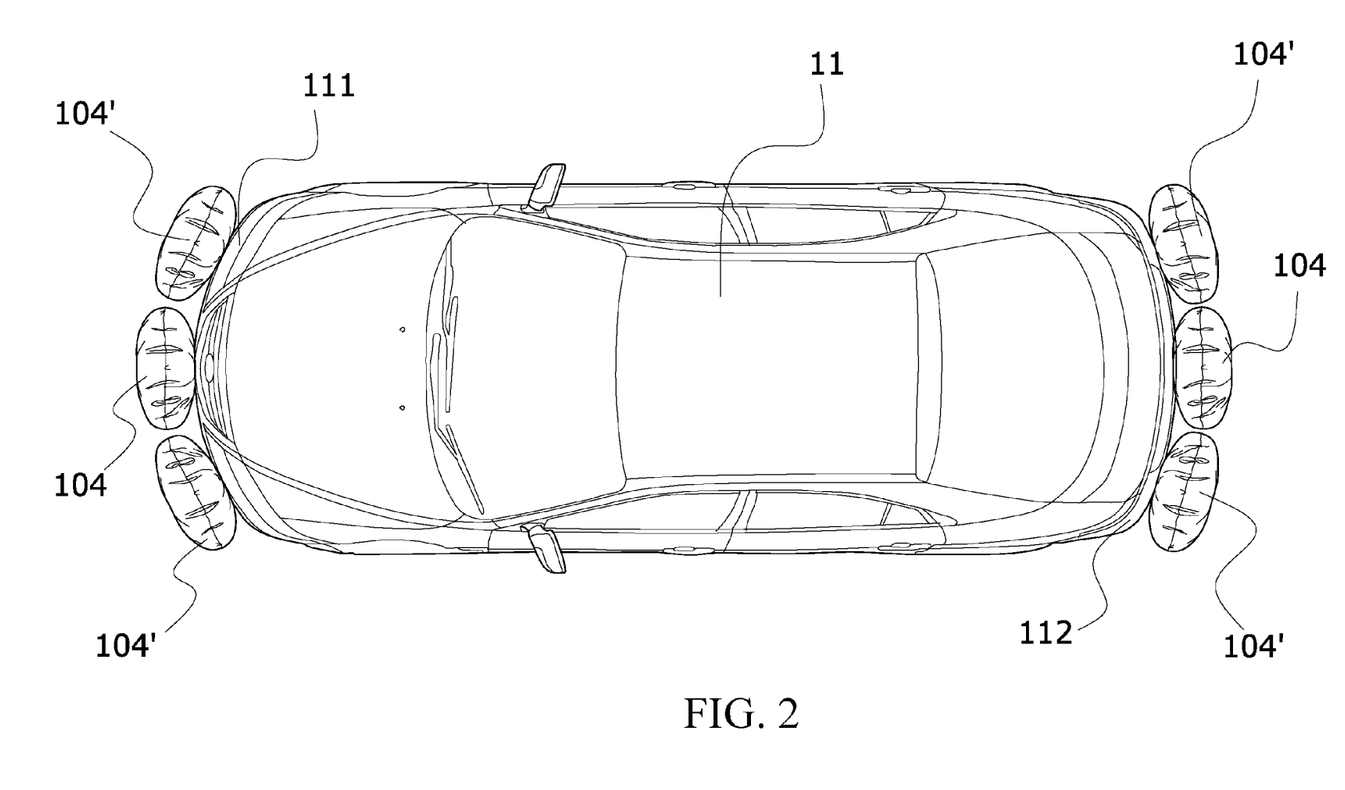
FIG. 2 is a schematic view of a configuration of the present invention.

Referring to FIG. 2 in combination, FIG. 2 is a schematic view of a configuration of the present invention, and referring to FIG. 1 in combination, the state detection device 101 is installed outside a vehicle 11, for example, on a front bumper 111 and a rear bumper 112 of the vehicle 11. The front and rear bumpers (111, 112) are configured with more than one set of shock absorption devices 104, respectively. For example, multiple sets of shock absorption devices (104, 104') can be installed on the font and rear bumpers (111, 112) at the same time.

Figure 3:
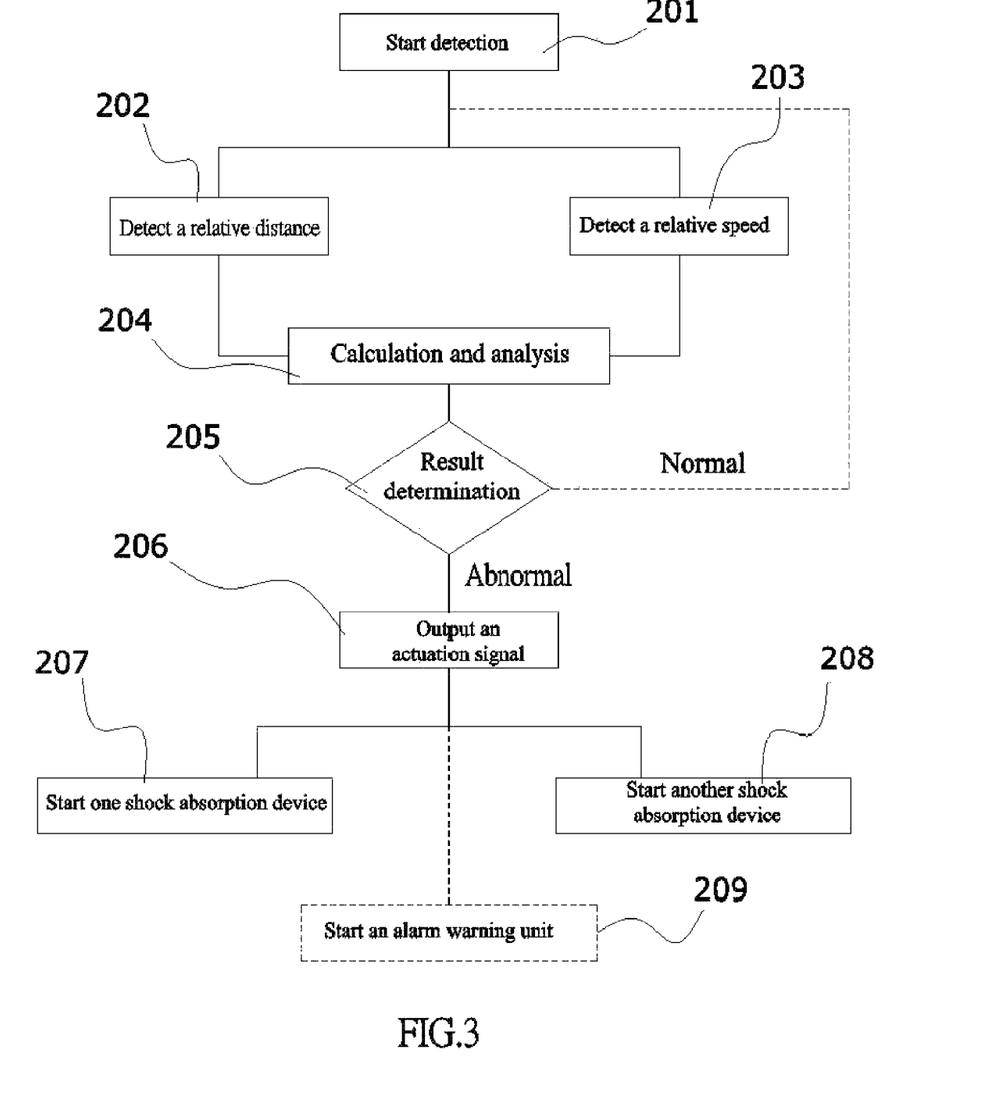
FIG. 3 is a schematic view of an implementation process of the present invention.

Referring to FIG. 3 FIG. 3 is a schematic view of an implementation process of an actuation method of the present invention, and further referring to FIG. 1 and FIG. 2 in combination, the steps are described as follows:

Step 201 of starting detection: When the vehicle 11 starts, the state detection device 101 is actuated immediately.

Step 202 of detecting a relative distance and Step 203 of detecting a relative speed: Following Step 201, after the state detection device 101 starts, then detect the relative distance between the vehicle 11 and another vehicle, in which the distance to be measured is mainly the distance between the front bumper 111 of the vehicle 11 and the rear bumper of the vehicle in front, or the distance between the vehicle 11 and a physical object in front, for example, a building's wall or other obstacles, synchronously detect the relative speed between the vehicle 11 and another vehicle (or another physical object outside the vehicle) (203), and transmit the detected relative distance and relative speed to the central control processing unit 102 which is informational connected with the state detection device 101 after the detection.

Step 204 of calculation and analysis: Next, the central control processing unit 102 calculates and analyzes the received relative distance and relative speed to generate monitored data.

Step 205 of result determination: The central control processing unit 102 determines the monitored data to generate a determination result. When the determination result is normal, Step 202 of detecting a relative distance, Step 203 of detecting a relative speed, Step 204 of calculation and analysis, and Step 205 of result determination are repeated in a continuous manner.

Step 206 of outputting an actuation signal: Next, when the determination result is abnormal, indicating that the vehicle 11 is in the danger of an imminent collision, the central control processing unit 102 transmits an actuation signal through the signal transmission unit 103.

Step 207 of starting one shock absorption device: The shock absorption devices 104 operates after being actuated by the actuation signal, therefore the vehicle 11 already has a shock absorption effect before the collision.

Step 208 of starting another shock absorption device: Next, the state detection unit 101 can continue detecting the current environmental conditions and actuate another shock absorption device 104' according to the practical situation to effectively reduce the impact on the vehicle 11.

Next, during Step 206 of outputting an actuation signal, Step 209 of starting an alarm warning unit can be operated synchronously, in which mainly the alarm warning unit 105 is started before Step 207 of starting one shock absorption device, so that the alarm warning unit generates an alarm tone to inform the driver of possible situations in advance, so that the driver can be in preparation of beforehand reactions.

Figure 4:
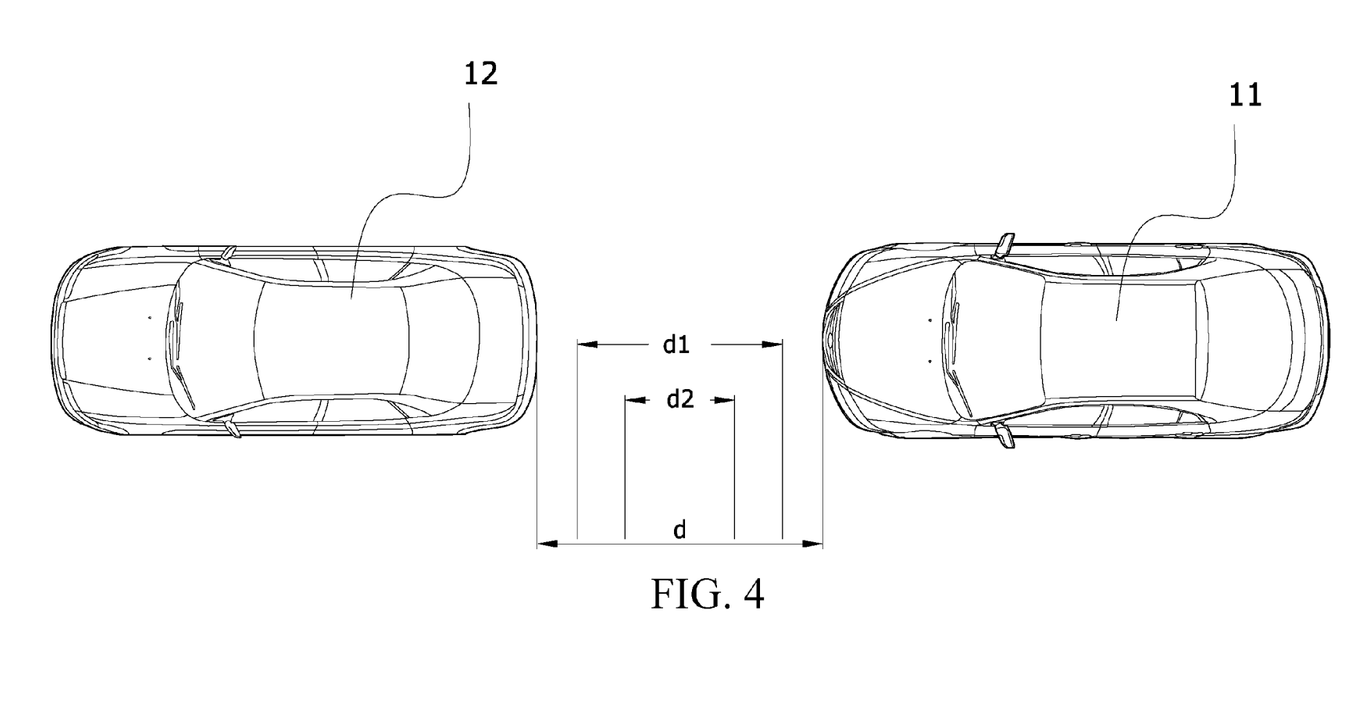
FIG. 4 is a schematic view (1) of the actuation of the present invention.

Referring to FIG. 4, FIG. 4 is a schematic view (1) of the actuation of the present invention. As shown in FIG. 4, a vehicle 12 is running in front of the vehicle 11. Further, when the two vehicles (11, 12) are running, the state detection device 101 (referring to FIG. 1) of the vehicle 11 further detects the vehicle speeds of the vehicle 11 and the vehicle 12, and synchronously detects the relative distance between the vehicle 11 and the vehicle 12 in front. For example, the safe distance between the two vehicles (11, 12) is preset as a distance d, namely, if the distance between the two vehicles is greater than the distance d, and the distance required for braking at the relative speed between the two vehicles is less than the distance d, the distance is a safe distance. The relative distance detection in the present invention can further separate the safe distance d into multiple sections for effectively monitoring the condition. As shown in FIG. 4, when the relative distance between the two vehicles (11, 12) is less than the distance d, the relative state between the two vehicles equivalently enters an alarm zone; further, when the distance between the two vehicles (11, 12) is less than a distance d1, the relative state between the two vehicles equivalently enters a danger zone; further, when the distance between the two vehicles (11, 12) is less than a distance d2, the relative state between the two vehicles (11, 12) equivalently enters a collision zone. Next, the present invention can effectively monitor the distance between the two vehicles (11, 12) according to different distance parameters to perform subsequent monitoring and actuation.

Figure 5:
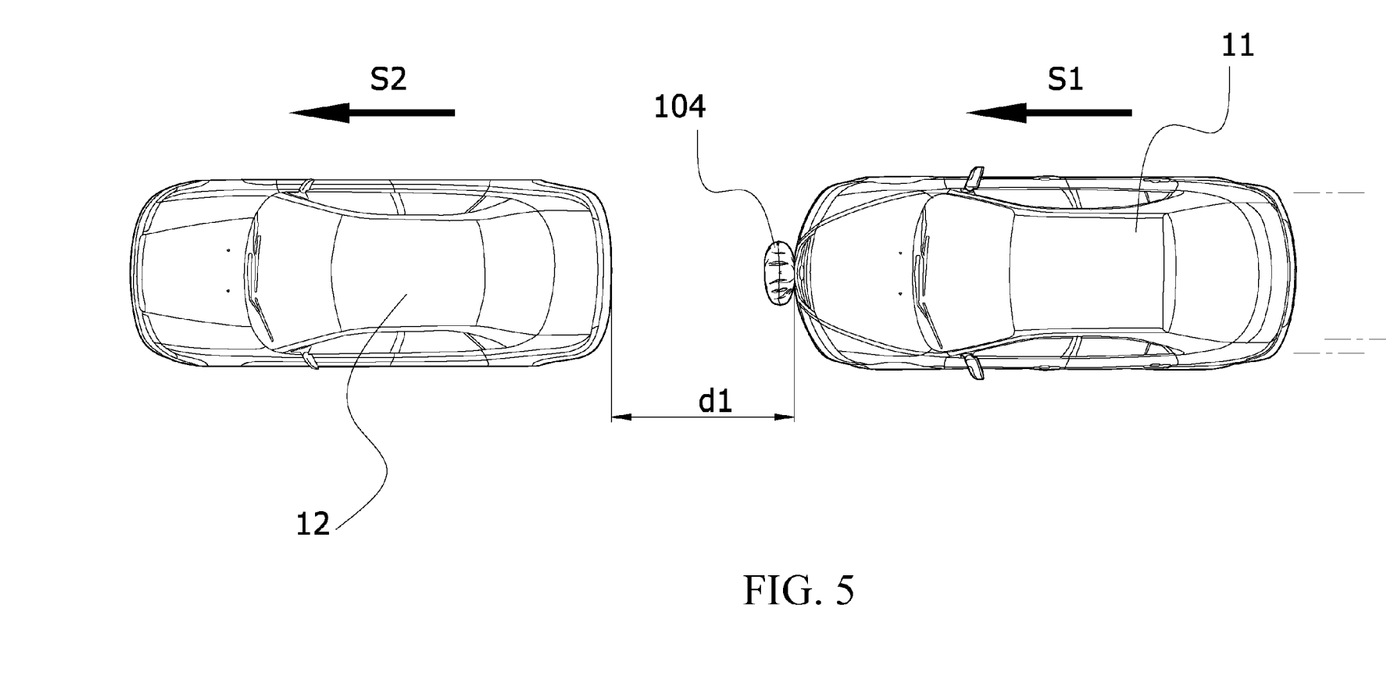
FIG. 5 is a schematic view (2) of the actuation of the present invention.
Figure 6:
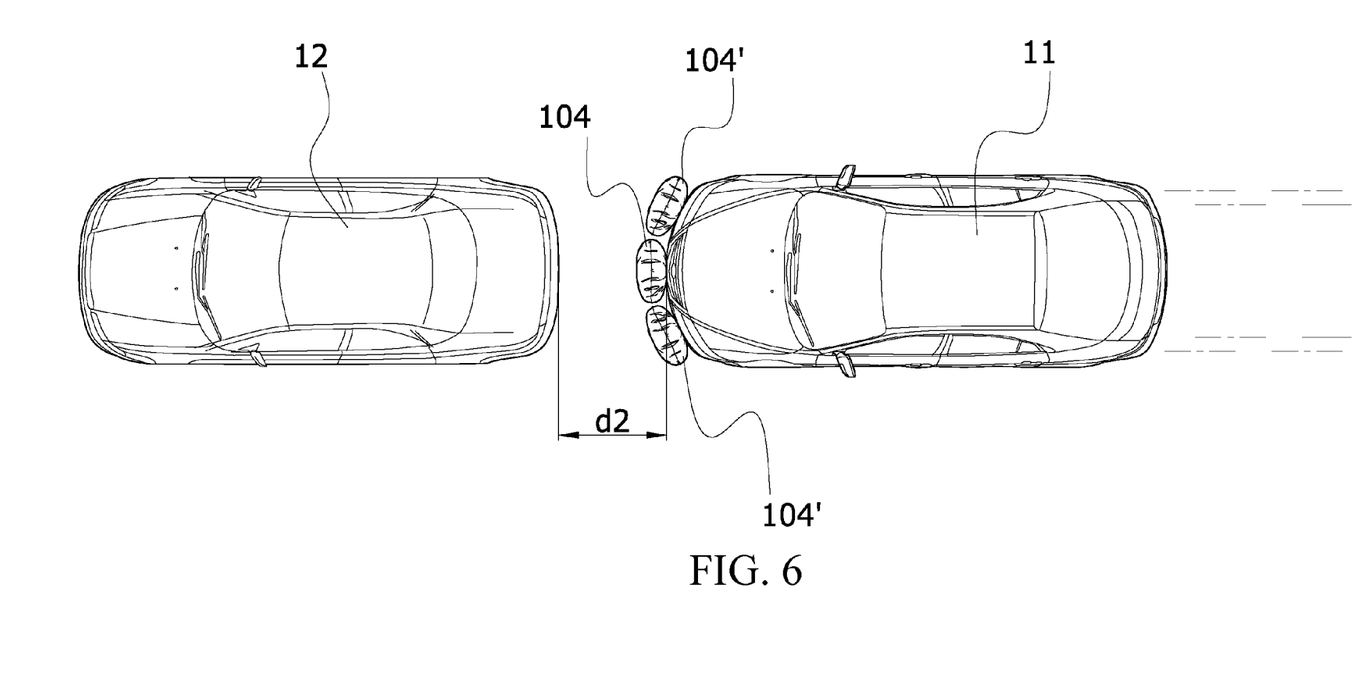
FIG. 6 is a schematic view (3) of the actuation of the present invention.

Further referring to FIG. 5, FIG. 5 is a schematic view (2) of the actuation of the present invention. Following the description of FIG. 4, the speed of the vehicle 11 is S1, the speed of the vehicle 12 is S2, and when the state detection device 101 detects that S1 is greater than S2, and the distance between the vehicle 11 and the vehicle 12 is less than the distance d (namely, the distance d1 that enters the alarm zone), for example, 10 meters, indicating that the vehicle 11 is in the danger of an imminent collision, the shock absorption device 104 is actuated in advance to cushion the impact on the vehicle 11 when possibly impacting the vehicle 12. Further, referring to FIG. 6, FIG. 6 is a schematic view (3) of the actuation of the present invention. Following the description of FIG. 5, to further reduce the impact on the vehicle 11 being impacted effectively, after the shock absorption device 104 is actuated, in the present invention, the shock absorption device 104 can continue the detection and start another shock absorption device 104' according to the situation. For example, for the vehicle 11 and the vehicle 12 shown in FIG. 6, after the shock absorption device 104 is actuated, if the distance between the vehicle 11 and the vehicle 12 is already less than the distance d1 (namely, the distance between the two vehicles already enters the danger zone distance d2), the central control processing unit 102 (referring to FIG. 1) further actuates the shock absorption device 104' to enable the front bumper 111 of the vehicle 11 to actuate the shock absorption devices (104, 104') in sequence at the instant, thereby achieving a better effect of cushioning the impact on the vehicle 11.

Figure 7:
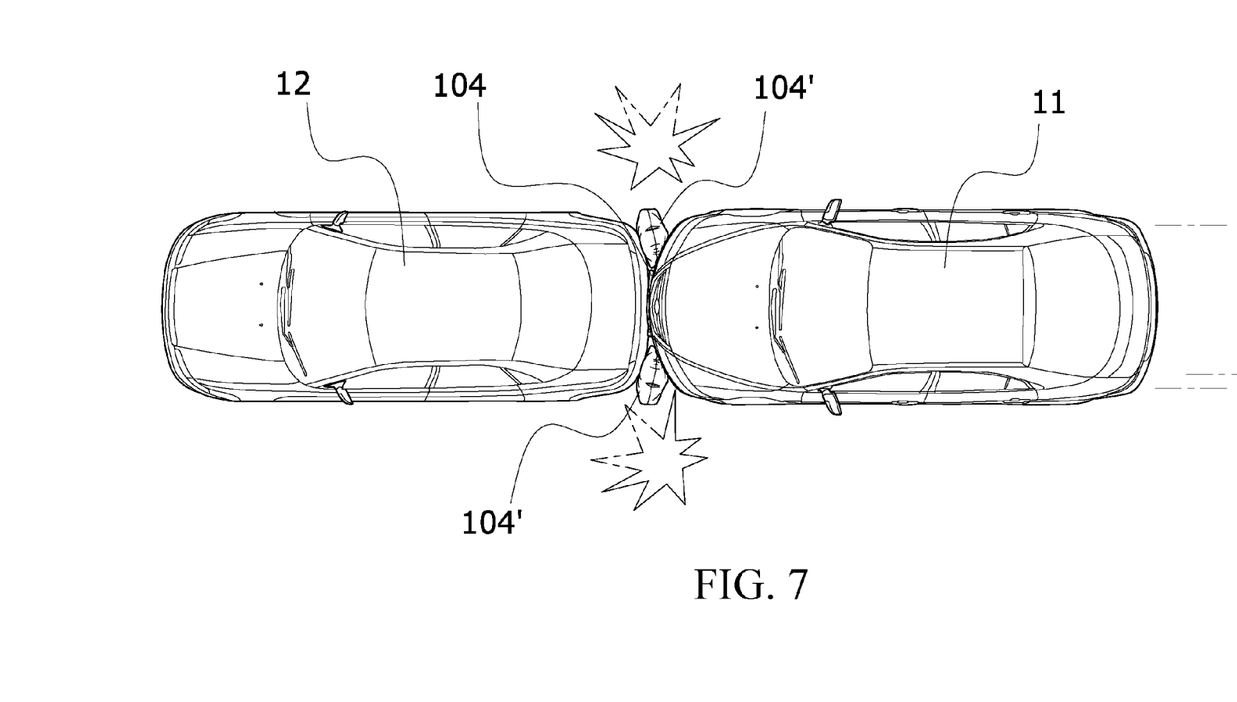
FIG. 7 shows another embodiment of the present invention.

Referring to FIG. 7, FIG. 7 shows another embodiment of the present invention. Following the description of FIG. 5, in the present invention, another shock absorption device 104' can be actuated synchronously when the vehicle 11 impact the vehicle 12. The shock absorption device 104 of the vehicle 11 is actuated in advance, so that the vehicle 11 already has a first section of shock absorbing capacity before the vehicle 11 impacts the vehicle 12, and another shock absorption device 104' is actuated synchronously during the impact, so that the vehicle 11 has a second section of shock absorbing capacity at this time, thereby significantly cushioning the impact on the vehicle 11 and effectively reducing injury and death as well as vehicle damage rates after an accident. Further, the shock absorption devices (104, 104') can further have an automatic release function, which, when activated, automatically releases the actuated condition (for example, releases an inflated condition of airbags) in a very short time.

In view of the above, the method of actuating an external active safety system for a vehicle of the present invention uses the state detection device to detect the relative distance and relative speed between the vehicle and other surrounding physical objects, and returns the detection result to the central control processing unit. The central control processing unit analyzes and monitors the detected data. When the detected data is abnormal, indicating that the vehicle is in the danger of an imminent collision, the central control processing unit further transmits an actuation signal by the signal transmission unit to actuate the sets of shock absorption devices in a segmental manner according to the condition. Therefore, the present invention, through implementation, can provide a method of actuating an external active safety system for a vehicle which can function in advance in a segmental manner through multiple sets of shock absorption devices to reduce injury and death as well as vehicle damage rates after an accident.

The above embodiments are merely exemplary embodiments, but are not intended to limit the present invention. Any equivalent changes or modifications made by persons skilled in the art without departing from the spirit and scope of the present invention should fall within the scope of the present invention.

In conclusion, the present invention meets the patent requirements such as industrial usefulness, novelty, and inventiveness. The applicant files an application for a patent for an invention in accordance with the provisions of the patent law.

What is claimed is:

1. A method of actuating an external active safety system for a vehicle, used for cushioning an impact during a collision accident, wherein the external active safety system for a vehicle has at least more than one shock absorption device installed outside the vehicle, and the implementation steps comprise:

a step of start detection, wherein a state detection device installed outside of the vehicle starts detecting synchronously when the vehicle starts;

a step of detecting a relative distance and a step of detecting a relative speed, wherein the state detection device detects the relative distance and the relative speed between the vehicle and another physical object surrounding the vehicle, and further transmits the detected relative distance and relative speed to a central control processing unit that has an information connection with the state detection unit;

a step of calculation and analysis, wherein the central control processing unit calculates and analyzes the relative distance and relative speed and generates monitored data;

a step of result determination, wherein the central control processing unit determines the monitored data and generates a determination result, and when the determination result is normal, the step of detecting a relative distance and the step of detecting a relative speed, the step of calculation and analysis, and the step of result determination are repeated in a continuous manner;

a step of outputting an actuation signal, wherein next, when the determination result is abnormal, the central control processing unit immediately transmits an actuation signal through a signal transmission unit;

a step of starting one shock absorption device, wherein one of the shock absorption devices operates first after being actuated by the actuation signal, so that the vehicle already has a shock absorption capacity before a collision; and a step of starting another shock absorption device, wherein next, the state detection unit continues detection according to a current environmental condition, and actuate another shock absorption device according to a practical situation to effectively reduce the impact on the vehicle.

2. The method of actuating an external active safety system for a vehicle according to claim 1, wherein after the step of outputting an actuation signal, a step of starting an alarm warning unit is operated.

3. The method of actuating an external active safety system for a vehicle according to claim 1, wherein another physical object mentioned in the step of detecting a relative distance and step of detecting a relative speed is another vehicle.

4. The method of actuating an external active safety system for a vehicle according to claim 1, wherein another physical object in the step of detecting a relative distance and the step of detecting a relative speed is an obstacle.

* * * * *